US012794283B2

(12) United States Patent
Schmitz et al.

(10) Patent No.: US 12,794,283 B2
(45) Date of Patent: Nov. 10, 2026

(54) STATOR CORE AND STATOR FOR AN AXIAL FLUX ROTATING ELECTRIC MACHINE

(71) Applicant: WEG EQUIPAMENTOS ELÉTRICOS S/A, Jaraguá do Sul (BR)

(72) Inventors: Daniel Schmitz, Jaraguá do Sul (BR); Mateus Moro Lumertz, Jaraguá do Sul (BR); Valmir Luis Stoinski, Jaraguá do Sul (BR)

(73) Assignee: WEG EQUIPAMENTOS ELÉTRICOS S/A, Jaraguá do Sul (BR)

( * ) Notice: Subject to any disclaimer, the term of this patent is extended or adjusted under 35 U.S.C. 154(b) by 204 days.

(21) Appl. No.: 18/656,357

(22) Filed: May 6, 2024

(65) Prior Publication Data

US 2025/0260272 A1 Aug. 14, 2025

(30) Foreign Application Priority Data

Feb. 14, 2024 (BR) ...................... 10 2024 002857 0

(51) Int. Cl.
*H02K 1/16* (2006.01)

(52) U.S. Cl.
CPC .................................. *H02K 1/165* (2013.01)

(58) Field of Classification Search
CPC .......... H02K 1/14; H02K 1/165; H02K 21/24; H02K 1/182; H02K 1/148
See application file for complete search history.

(56) References Cited

U.S. PATENT DOCUMENTS 8,736,135 B2 * 5/2014 Asano .................... H02K 1/182
310/216.057
10,454,325 B2 * 10/2019 Takahashi .............. H02K 1/182

FOREIGN PATENT DOCUMENTS

CN 110417139 A * 11/2019 ............. H02K 1/148
JP 2010017072 A * 1/2010 ............. H02K 1/148

OTHER PUBLICATIONS

JP-2010017072-A machine translation Jan. 8, 2026.*
CN-110417139-A machine translation Jan. 8, 2026.*

* cited by examiner

*Primary Examiner* — Leda T Pham
(74) *Attorney, Agent, or Firm* — Tarolli, Sundheim, Covell & Tummino LLP

(57) ABSTRACT

A stator core for an axial flux rotating electric machine may include two preferably identical, one-piece core sections (X1, X2, X3, X4) that are juxtaposed to form said core, and at least the central body is a non-continuous body that includes at least one intermittence.

8 Claims, 5 Drawing Sheets

(a) (b) (c)

STATOR CORE AND STATOR FOR AN AXIAL FLUX ROTATING ELECTRIC MACHINE

RELATED APPLICATIONS

This application is a U.S. Nonprovisional Application, claiming priority to Serial No. BR 10 2024 002857 0, filed on 14 Feb. 2024, the entirety of which are hereby incorporated herein by reference.

FIELD OF THE INVENTION

The present invention refers to the core of the stator of rotating electric machines, more specifically to axial flux rotating electric machines.

BACKGROUND OF THE INVENTION

Electric machines are equipment used to transform electric into mechanical energy, in the case of motors, and vice-versa, in the case of generators. They are generally comprised of four basic structures: the rotor, which is the rotating energized component, a static element called stator, equally energized, bearings responsible for joining the static and rotating parts, and, lastly, the shell, which plays the role of casing and promotes integration with other auxiliary systems.

Electric machines can be categorized based on various characteristics, one of these being the direction of the magnetic flux. The main categories are the radial flux and axial flux machines.

In an axial flux machine, the flux travels in the axial direction, parallel to the mechanical axis of the machine. This occurs due to the constructive aspects of the machine, which is generally designed with at least one stator, comprising multiple coils disposed axially, and at least one rotor, generally flat or in the shape of a disk, which contains permanent magnets. Accordingly, the magnetic fields created by the rotor and by the stator align in the same axial direction, generating torque and causing the machine to rotate.

The axial flux motors comprise arrangements in which the stator may or may not have a yoke, the latter referred to as “yokeless”, enabling greater torque density, with reduced space volume and electric consumption. The absence of the yoke also enables total savings of weight due to the reduced mass of the motor.

However, the difficulty found in all electric machines generally relates to energy losses, which directly influence the performance of the machines and may be split into four segments: losses in iron, mechanical losses, Joule effect losses and supplementary losses.

Losses in iron may be divided into hysteresis losses and eddy current losses. Hysteresis losses depend on microstructural characteristics of the material of the magnetic core, such as impurity bonds, mechanical stresses, grain size and bonds. Eddy current losses mostly result in the circulation of electric currents induced in the ferromagnetic core of the motor.

The need to control eddy currents is particularly relevant in axial flux electric machines, since the demand for this type of machine has been increasing on the automobile market and in industrial applications and same has elevated losses in high-speed applications.

The use of SMC (Soft Magnetic Composites) is known in the state of the art for axial flux motors, since said material enables the stator core to be formed by non-laminated solid parts.

The concept of SMC composites is based on coating the magnetic particles with a surface layer, of the order of nanometers, electrically insulating and, subsequently, said particles being joined in a three-dimensional matrix shape. Consequently, 3D magnetic properties are acquired due to the isotropic nature of this material, thus offering freedom to create project concepts in unique and innovative applications.

A drawback associated to this type of material is the possible appearance of significant levels of eddy currents, mainly in large cores and which operate at high frequency.

Consequently, there is an ongoing search for technical solutions that promote the optimization of the structural characteristics of the core of the stator of axial flux motors and enable a reduction in the formation of eddy currents.

One known solution is described, for example, in document KR102458545B1. This document describes a motor capable of increasing the performance by reducing eddy currents. The motor comprises: a rear disk of the stator forming a magnetic path; a plurality of cogs of the stator that are formed radially on a top surface of the rear disk of the stator and are manufactured using soft magnetic powder; and a first recessed slot in at least one of the top surface of the rear disk of the stator and a top surface of the cogs of the stator in an axial motor wherein the magnetic field is formed in an axial direction.

Document EP1536542B1 describes an electric machine that restricts the generation of an eddy current caused by the leaked magnetic flux and reduces the loss of iron due to the eddy current. A cog is mounted on a stator disk in a state wherein at least part thereof (a portion to be inserted into the disk) is inserted into an insertion orifice formed by way of the surface opposite the stator disk, and the traverse section area of the cog portion to be inserted into the disk, which is taken perpendicularly relative to the magnetic force lines generated on the cog when a reel is energized, is greater than the transverse section area of the portion to be disposed inside the reel of the cog, which is taken perpendicularly relative to the magnetic force lines.

OBJECTIVES OF THE INVENTION

It is one of the objectives of the invention to provide a stator core for an axial flux rotating electric machine whose construction and geometry enables the reduction of eddy currents.

It is another objective of the invention to provide a stator core for an axial flux rotating electric machine, the stator having lower manufacturing cost and compact and light geometry for various applications.

BRIEF DESCRIPTION OF THE INVENTION

The present invention refers to a stator core for an axial flux rotating electric machine, which comprises a central structure formed of conductive material, wherein the central structure comprises at least one intermittence formed by a discontinuity of the conductive material.

In an embodiment of the present invention, the central structure is formed of two preferably identical single-part core sections which are juxtaposed to form the core, each one of the core sections comprising a central body and the at least one intermittence being formed in the central body.

In an embodiment of the present invention, at least one intermittence is from 0.2 mm to 5 mm thick, more preferably 2.0 mm to 3.0 mm thick.

In embodiments of the present invention, each one of said core sections may comprise a foundation and a central body which projects from the said foundation, said foundation forming an edge around a bottom perimeter of the central body. The edge of the foundation may also have at least one intermittence which has the form of a slot, preferably from 0.2 mm to 5 mm thick, more preferably from 2.0 mm to 3.0 mm thick.

In an embodiment of the present invention, the at least one intermittence has the form of a slot which extends between the lower perimeter of the central body and an outer perimeter of the edge. Therefore, in an embodiment of the present invention, said slot is preferably from 0.2 mm to 5 mm thick, more preferably from 2.0 mm to 3.0 mm thick.

In another embodiment, each one of said core sections comprises four intermittences in the form of four slots which extend from the bottom perimeter of the central body to the outer perimeter of the edge and are positioned symmetrically relative to a geometric center of the core section.

In embodiments of the present invention, the central body is a segmented body with two lowered blocks and two bulging blocks, the lowered blocks being disposed diagonally considering a transverse plane that passes through a longitudinal geometric axis of the core section and the bulging blocks being disposed diagonally in a mirrored way considering the same transverse plane. In these embodiments, the at least one intermittence is formed between the two bulging blocks, and the lowered blocks are the same height, the bulging blocks are the same height and the height of the bulging blocks is greater than the height of the lowered blocks.

Preferably, one of the lowered blocks has a top surface with a same size and with a mirrored shape as a top surface of one of the bulging blocks; and the other one of the lowered blocks has a top surface with a same size and with a mirrored shape as a top surface of the other one of the bulging blocks.

In an embodiment of the present invention, the at least one intermittence of the edge of the foundation and the at least one intermittence of the central body are contiguous and take the shape of a slot which extends from an outer perimeter of the edge up to the inner region of the central body.

The core section may comprise three intermittences of the edge of the foundation and three intermittences of the central body, each one of the intermittences of the edge of the foundation and each one of the intermittences of the central body are contiguous.

In an embodiment of the present invention, the at least one intermittence of the central body is a straight slot which extends along a portion of a central longitudinal geometric axis of the core section.

In embodiments of the present invention, an outer surface of the foundation of each core section has at least one groove. Preferably, the outer surface has a plurality of grooves forming parallel channels transverse to a central longitudinal geometric axis of the core section.

The present invention also refers to a stator for an axial flux rotating electric machine that comprises a plurality of cores according to the present invention.

BRIEF DESCRIPTION OF THE DRAWINGS

The present invention will now be described in greater detail, with references to the accompanying drawings, wherein.

DETAILED DESCRIPTION OF THE INVENTION

Figure 1:
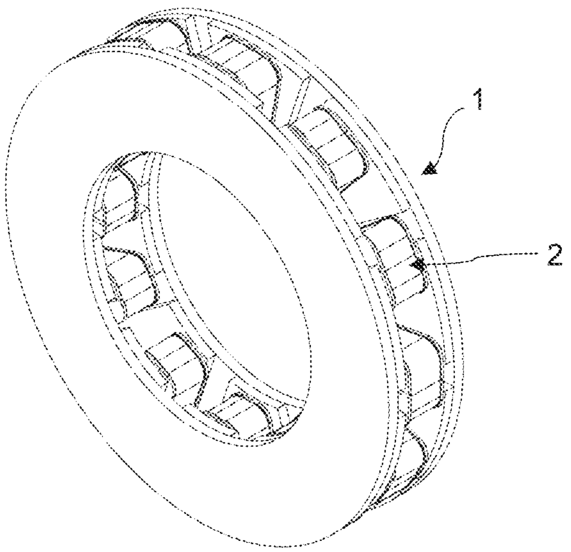
FIG. 1—is a perspective view of an axial flux motor with yokeless stator comprising the stator core according to the present invention.
Figure 2:
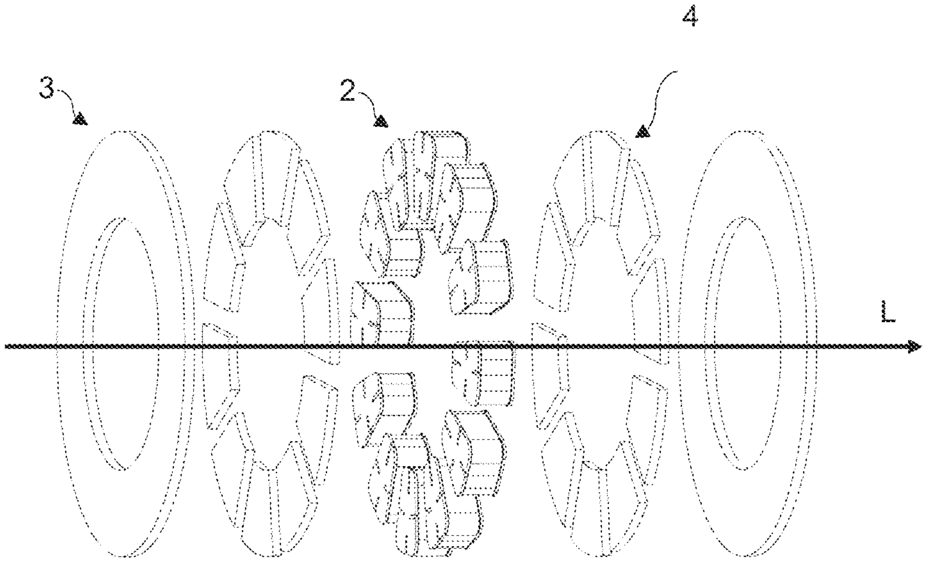
FIG. 2—is an exploded view of the main components of an axial flux motor with yokeless stator comprising the stator core according to the present invention.

FIG. 1 shows a perspective view of an axial flux motor 1 comprising the stator core 2 according to the present invention. FIG. 2 presents an exploded view of this motor, in an arrangement that comprises a stator 2 and two rotors 3. Although FIGS. 1 and 2 present just one stator and two rotors, the present invention may be implemented in any axial flux motor arrangement, such as a stator and a rotor, a stator between two rotors, a rotor between two stators or various stages, including various rotors and stators on the same axis.

FIG. 2 also illustrates the cores 2 of the yokeless stator, as well as the permanent magnets 4 that make up the rotors 3.

Naturally, a person skilled in the art would have no difficulty in understanding that an axial flux motor may include other components not described herein, such that only the relevant elements for understanding the present invention will be described and presented.

As noted in the drawings of the present invention, the core of the yokeless stator is comprised of a one-piece central structure or divided into two preferably equal single-piece sections X1, X2, X3, X4 which are produced, preferably, from soft magnetic composites (SMC). The core sections may be manufactured for example, by using, for example, a 3D printing method or compacting the coated powder in a matrix to form a solid material, which is then thermally treated to cure the bonds and oxidation around the particles to increase the resistivity of the magnetic core. It is worth noting that although the cores of the present invention are preferably produced from SMC, they could be manufactured from any other conductive material having electric, magnetic and/or thermal conductivity capacity.

In embodiments of the present invention, the sections X1, X2, X3, X4 comprise a foundation 6, 60, 600 and a central body 7, 70, 700 which projects from said foundation 6, 60, 600. Therefore, the central bodies 7, 70, 700 can be joined in an arrangement juxtaposed to form the structure of the stator cores 2. Said fastening can be carried out, for example, on a support of the stator, which comprises an outer plate positioned around the cores 2.

In the embodiments illustrated of the present invention, the central body 7, 70, 700 has, at least in the region in which it projects from the foundation 6, 60, 600, a preferably elongated trapezoidal cross-section with four rounded corners. It should be emphasized, however, that the central body could be another shape such as, for example, elliptical, circular or rectangular format.

Figure 3:
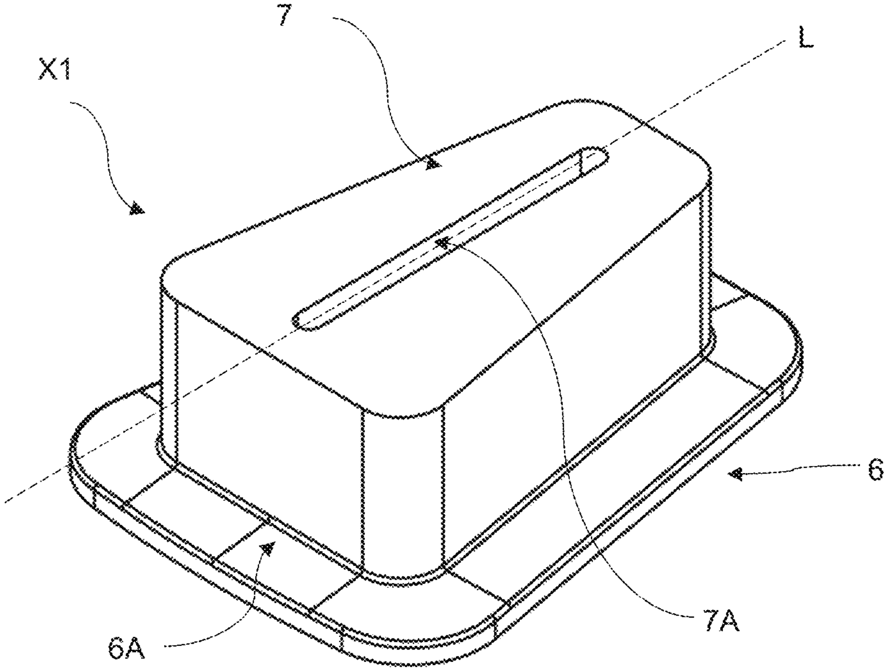
FIG. 3—is a perspective view of a stator core section according to a first embodiment of the present invention.

FIG. 3 illustrates a first embodiment of a core section X1 according to the present invention. In this embodiment, the core section comprises a foundation 6 and a central body 7 which projects from the foundation 6. The foundation 6 forms an edge 6A around the region from where the central body 7 projects. Therefore, the edge 6A is formed around a bottom perimeter of the central body 7. The preferred embodiment of the present invention, the foundation 6 and the central body 7 are formed in a single part. Nevertheless, it is to be noted that in alternative arrangements of the present invention, the foundation 6 and the central body 7 could be formed in different parts, being subsequently joined to form a core.

In this embodiment, the central body 7 has an elongated trapezoidal cross-section with four rounded corners and at least one intermittence 7A meaning the central body 7 is not continuous.

As shown in FIG. 3, the intermittence 7A is preferably a straight slot which extends along a portion of a geometric longitudinal axis L without reaching a region of the edges of the trapezoid shape of the body 7. Preferably, the straight slot forming the intermittence 7A extends for a greater length than one half of a greater longitudinal length of the trapezoid shape. Also in this embodiment, the straight slot forming the intermittence 7A is preferably 0.2 mm to 5 mm thick, more preferably 2.0 mm to 3.0 mm.

It must be highlighted, however, that in alternative embodiments of the present invention, the slot may not be on the longitudinal axis. Accordingly, in said embodiments, a slot may be, for example, diagonal or transverse. Additionally, more than one slot, colinear or otherwise, may be seen in embodiments of the present invention. Additionally, the slot may be penetrating, passing through the body, or non-penetrating, like a recess.

In the embodiment illustrated, the intermittence/slot 7A is formed on the body 7, but, in alternative embodiments of the present invention, the intermittence/slot 7A could extend, for example, as far as a region of the edge 6A in one of the bases of the trapezoid shape, or even as far as a region of the outer perimeter of the edge 6A.

Figure 4:
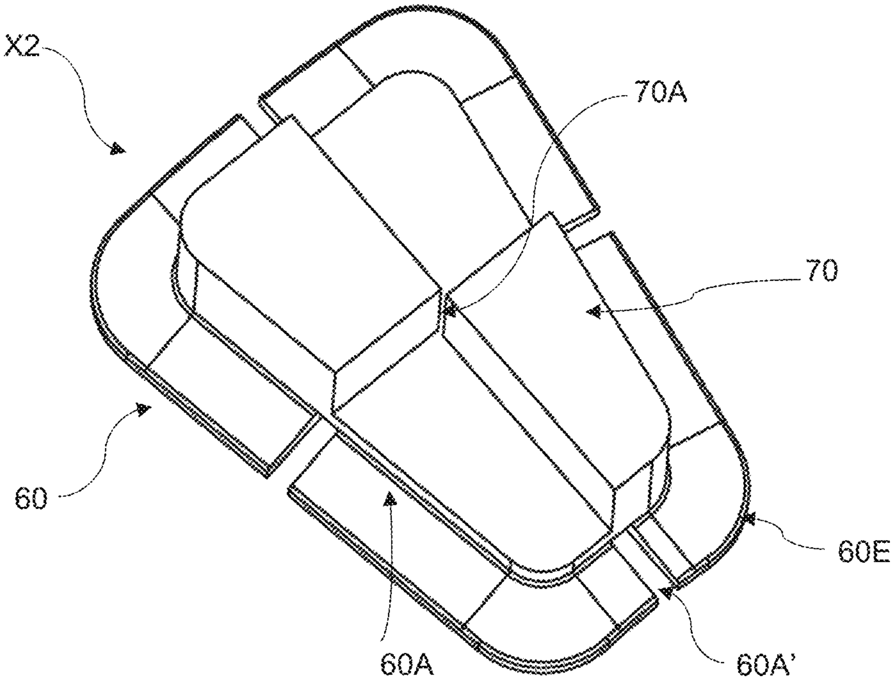
FIG. 4—is a perspective view of a stator core section according to a second embodiment of the present invention.
Figure 5:
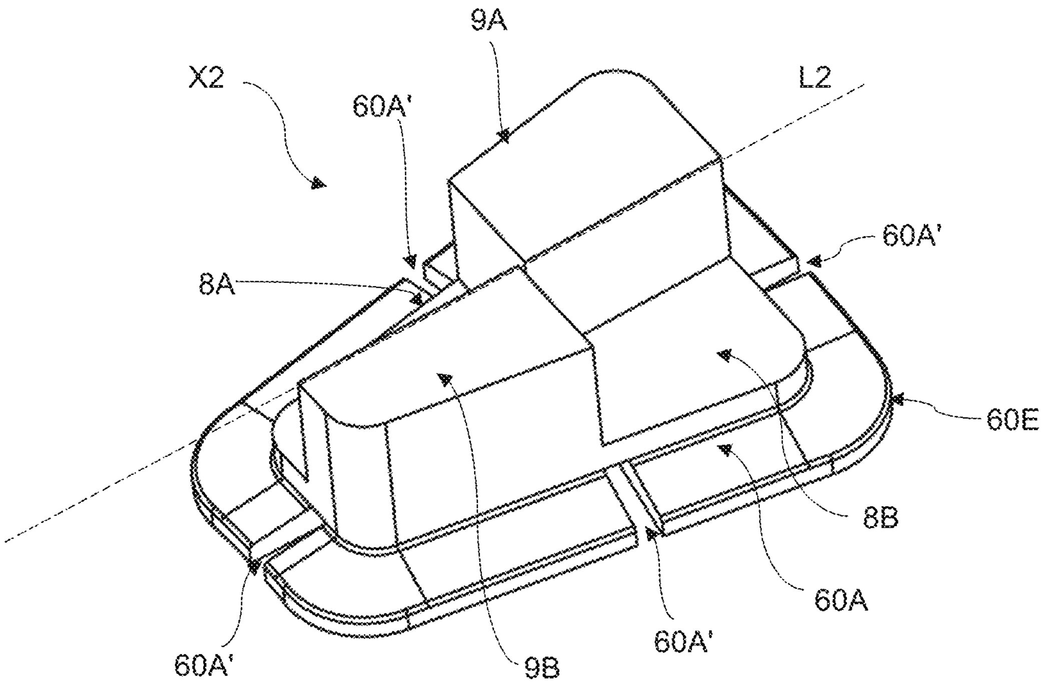
FIG. 5—is another perspective view of a stator core section according to the second embodiment of the present invention.
Figure 6:
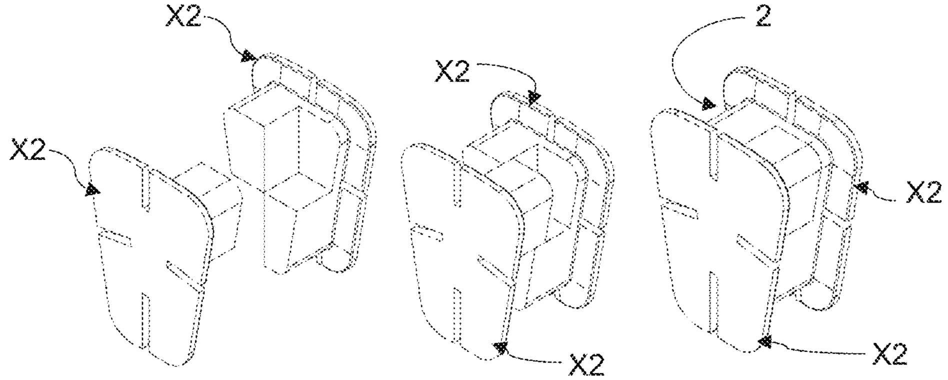
FIG. 6—is a schematic illustration of the assembly of a stator core of the core section according to the second embodiment of the present invention.

FIGS. 4 to 6 illustrate a second embodiment of a core section X2 according to the present invention. In this embodiment, the core section comprises a foundation 60 and a central body 70 which projects from the foundation 60. The foundation 60 forms an edge 60A around the region from which the central body 70 projects. Accordingly, the edge 60A is formed around a bottom perimeter of the central body 70.

However, the foundation 60 is formed such that the edge 60A is non-continuous. Accordingly, the edge 60A has at least one intermittence 60A' meaning that the edge is not continuous.

The intermittence 60A' may preferably be the shape of a straight slot that extends between an outer perimeter 60E of the edge 60A and a bottom perimeter of the central body 70, as shown in FIGS. 4 and 5. In this embodiment, the intermittence 60A' is from 0.2 mm to 5 mm thick, more preferably 2.0 mm to 3.0 mm thick.

Also in the embodiment of the core section of FIGS. 4 and 5, the edge 60A comprises four intermittences 60A' which extend from the lower perimeter of the central body 70 to the outer perimeter 60E of the edge 60A and are positioned symmetrically relative to the geometric center of the core section X2. It must be emphasized, however, that in alternative embodiments the edge 60A could present another quantity of intermittences, positioned symmetrically or otherwise.

The central body 70 is formed in a manner of being a non-continuous body, with at least one intermittence 70A. In the embodiment shown in FIGS. 4 to 6, the central body 70 is segmented and has two lowered blocks 8A, 8B and two bulging blocks 9A, 9B.

The lowered blocks 8A, 8B are disposed preferably diagonally considering a transverse plane that passes through the geometric longitudinal axis L2 of the section X2 and the bulging blocks 9A, 9B are disposed diagonally in a mirrored way, considering the same transverse plane. The intermittence 70A is formed between the two bulging blocks 9A, 9B.

In the embodiment illustrated, blocks 8A, 8B are the same height and blocks 9A, 9B, are the same height. However, the heights could be different, provided they enabled juxtaposition between two preferably identical core sections. Accordingly, there could be embodiment wherein the added heights of blocks 9A and 8B are equal to the added heights of blocks 9B and 8A, but wherein the heights of 9A and 9B and 8A and 8B are different. Additionally, blocks 8A and 9A have top surfaces with the same size and with a mirrored shape, which also occurs with blocks 8B and 9B. This means that in juxtaposing the two preferably single-part identical core sections X2, blocks 8A and 8B, 9A and 9B of one section are respectively juxtaposed with blocks 9A and 9B and 8A and 8B of the other core section.

FIG. 6 schematically illustrates the juxtaposition between two preferably identical core sections. Accordingly, figure (a) shows two preferably identical X2 core sections with the central bodies facing each other. Figure (b) shows the two sections X2 during encasement and figure (c) shows the sections X2 once assembled for the formation of the stator core 2.

It is noted that in the preferred arrangement of the present invention the two sections with juxtaposed cores are identical. However, in alternative arrangements of the present invention, the two core sections may differ to each other, such as, for example, the juxtaposition of X1 with X4.

Figure 7:
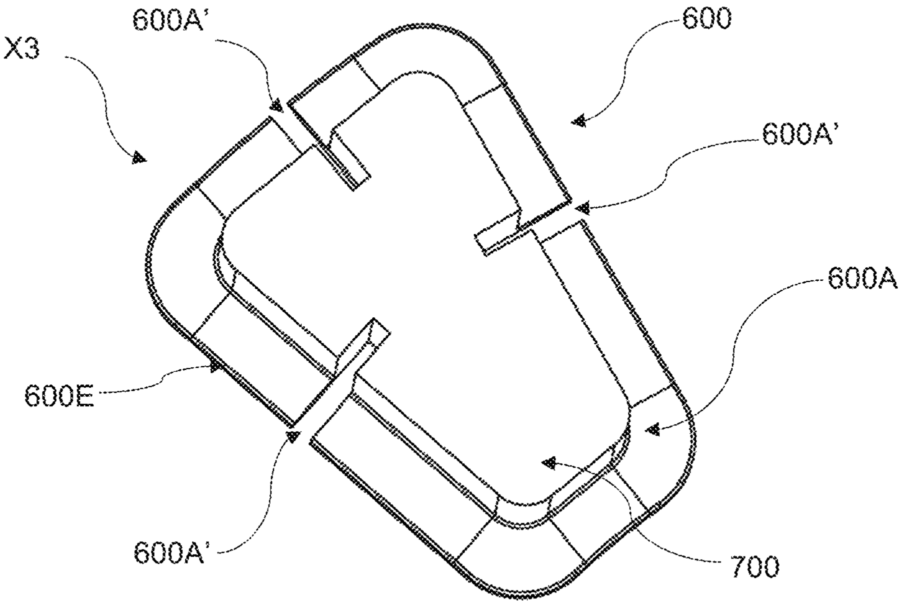
FIG. 7—is a top perspective view of a stator core section according to a third embodiment of the present invention.

FIG. 7 illustrates a third embodiment of a core section X3 according to the present invention. In this embodiment, the core section comprises a foundation 600 and a central body 700 which projects from the foundation 600. The foundation 600 form an edge 600A around the region from whether the central body 700 projects. Accordingly, the edge 600A is formed around a bottom perimeter of the central body 700.

The core section X3 is formed such that the edge 600A and the central body 700 are non-continuous. Accordingly, the section has at least a contiguous intermittence 600A' that preferably has the shape of a straight slot that extends from the outer perimeter 600E of the edge 600A as far as the inner region of the central body 700. In this embodiment, the contiguous intermittence 600A' is preferably 0.2 mm to 5 mm thick, more preferably 2.0 mm to 3.0 mm.

In the embodiment of FIG. 7, the core section X3 comprises three contiguous intermittences 600A' which extend from the outer perimeter of the edge 600A to the internal region of the central body 700. It should be emphasized, however, that in alternative embodiments, the X3 section could present another quantity of straight slots which extend on the edge and for part of the central body of the core section. It should be emphasized, however, that in alternative embodiments of the present invention, the intermittences 600A' extend only on the edge 600A, not entering into the body 700. However, the reduction in losses through eddy currents will be lesser.

Figure 8:
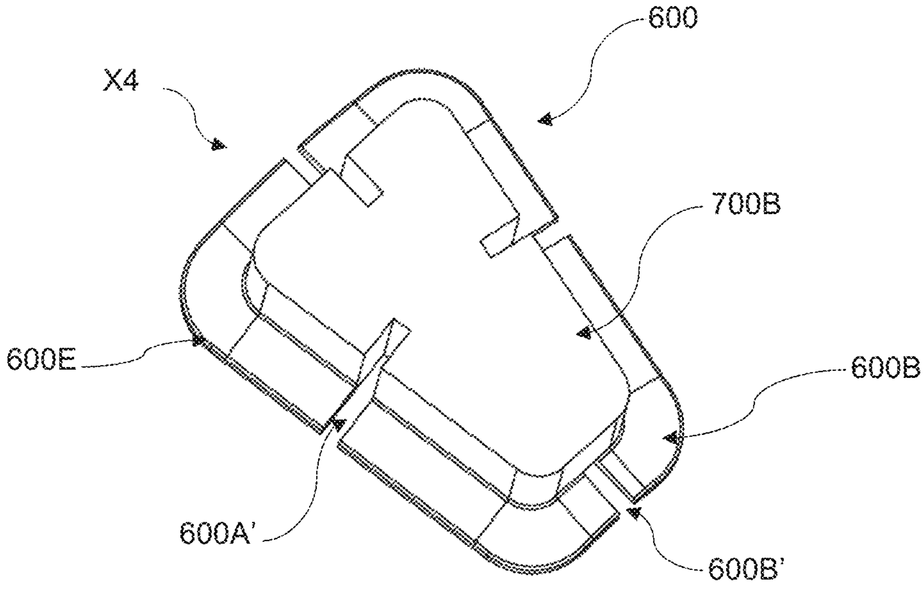
FIG. 8—is a top perspective view of a stator core section according to a fourth embodiment of the present invention.

FIG. 8 illustrates a fourth embodiment of a core section X4, whose construction is similar to the embodiment of FIG. 7, but whose edge 600B also presents an intermittence 600B' which projects from the outer perimeter of the edge 600B as far as the bottom perimeter of the central body 700B.

Figure 9:
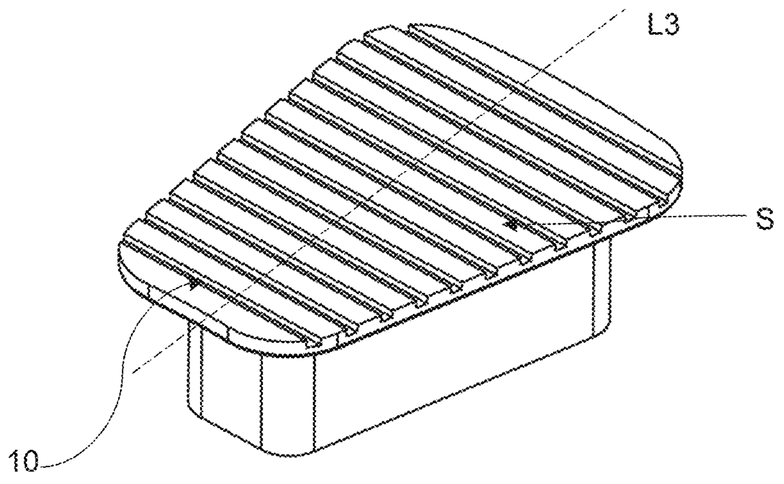
FIG. 9—is bottom view of a core section according to the present invention.

FIG. 9 illustrates a possible embodiment of the foundation of the core section of the present invention, in which an outer surface S of the foundation has at least one groove 10 so as to form a surface with discontinuity.

In the embodiment of FIG. 9, the outer surface S presents a plurality of grooves 10 forming parallel channels transverse to a central longitudinal geometric axis L3 of the core section. In other embodiments of the invention, the outer surface S could comprise a different quantity of grooves disposed in a non-parallel way or in another manner relative to the longitudinal axis.

Additionally, it should be emphasized that the embodiment of FIG. 9 could be combined with the embodiments of FIGS. 3 to 8, providing grooves 10 on the outer surfaces S of the foundations shown in FIGS. 2 to 8.

The constructive solutions of the core section of the present invention-intermittences on the foundation and on the body part, the segmentation of the body part and discontinuities on the surface of the foundation-promote the decrease in the total length of the path of the eddy currents, meaning that the losses, arising from this type of current, are considerably reduced.

Having described preferred sample embodiments of the present invention, it should be understood that the scope of the present invention covers other possible variations of the inventive concept described, being limited solely by the content of the accompanying claims, potential equivalents included therein.

The invention claimed is:

1. A stator core for an axial flux rotating electric machine, comprising a central structure formed of conductive material, the central structure being formed by at least one single-part core section comprising a central body, wherein the central structure comprises at least one intermittence formed by a discontinuity of the conductive material, wherein the at least one intermittence is an elongated slot which passes through the central body of the at least one single-part core section.

2. The stator core according to claim 1, wherein the central structure is formed by two identical single-part core sections (X1, X2, X3, X4) which are juxtaposed to form the core.

3. The stator core according to claim 2, wherein the elongated slot extends along a portion of a longitudinal geometric axis (L) of the core section (X1).

4. The stator core according to claim 2, wherein each of the core sections comprises a foundation and the central body projects from the foundation, the foundation forming an edge around a bottom perimeter of the central body.

5. The stator core according to claim 4, wherein the edge of the foundation has at least one further intermittence having the shape of a slot which extends between the lower perimeter of the central body and an outer perimeter of the edge.

6. The stator core according to claim 2, wherein:

each one of the core sections (X3, X4) comprises a foundation and the central body projects from the foundation, the foundation forming an edge around a bottom perimeter of the central body wherein the edge of the foundation has at least one further intermittence which is contiguous with the at least one intermittence of the central body, the contiguous intermittence taking the shape of a slot which extends from an outer perimeter of the edge as far as an inner region of the central body.

7. The stator core according to claim 1, wherein:

an outer surface(S) of the core section has a plurality of grooves forming parallel channels transverse to a central longitudinal geometric axis (L3) of the core section.

8. A stator for an axial flux rotating electric machine comprising a plurality of cores wherein each of the plurality of cores comprises a central structure formed of conductive material, the central structure being formed by at least one single-part core section comprising a central body, wherein the central structure comprises at least one intermittence formed by a discontinuity of the conductive material, wherein the at least one intermittence is an elongated slot which passes through the central body of the at least one single-part core section.

* * * * *